United States Patent

Trenkamp et al.

[11] 4,056,712
[45] Nov. 1, 1977

[54] WEAR COMPENSATING OPTICAL/MAGNETIC TRANSDUCER

[75] Inventors: Robert H. Trenkamp, Cleveland Heights; Gerald A. Dissauer, South Euclid, both of Ohio

[73] Assignee: Addressograph Multigraph Corporation, Cleveland, Ohio

[21] Appl. No.: 694,384

[22] Filed: June 9, 1976

[51] Int. Cl.² .................. G11B 5/25; G06K 7/01
[52] U.S. Cl. ........................... 235/440; 235/449; 360/119; 235/473
[58] Field of Search .................. 360/119, 120; 235/61.11 E, 61.11 D

[56] References Cited

U.S. PATENT DOCUMENTS 3,612,835  10/1971  Andrews et al. ............ 235/61.11 E Primary Examiner—Vincent P. Canney
Attorney, Agent, or Firm—Harry M. Fleck, Jr.

[57] ABSTRACT

A wear compensating transducer is provided for reading optical and magnetic data from documents comprising a magnetic read head with a group of optical fibers passing through the reluctance gap and with the fiber ends disposed for wiping engagement with documents as they are read. The fiber ends define an optical reading aperture which remains substantially constant as the fiber ends wear with the contact surface of the magnetic head.

10 Claims, 5 Drawing Figures

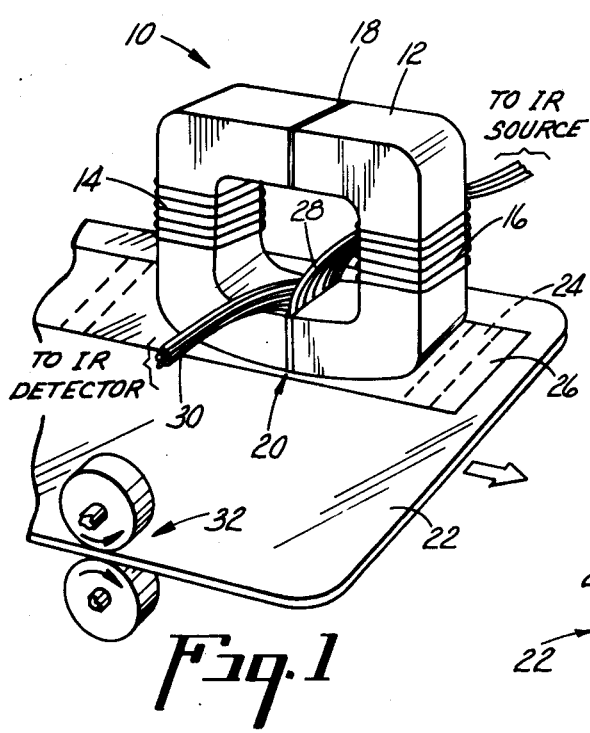
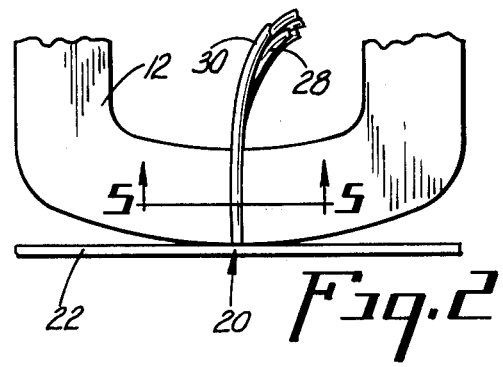
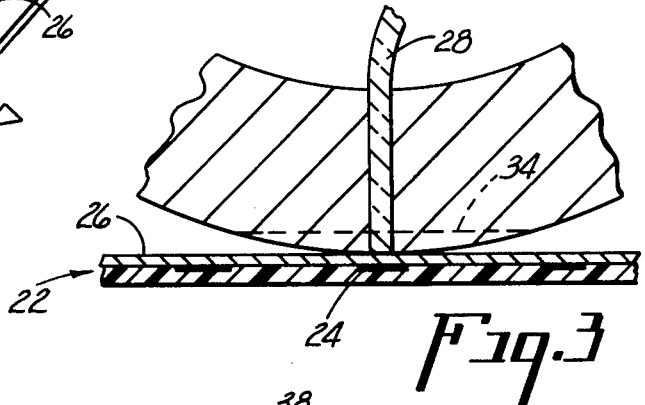
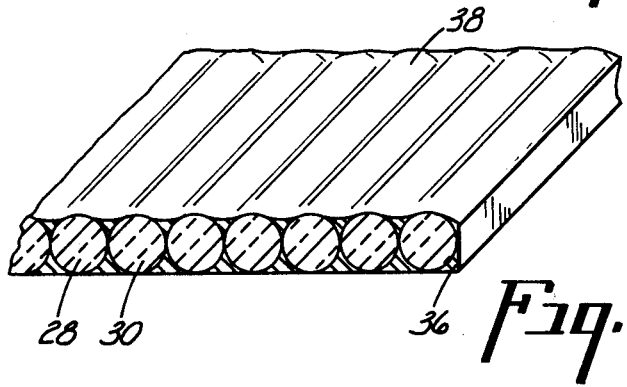
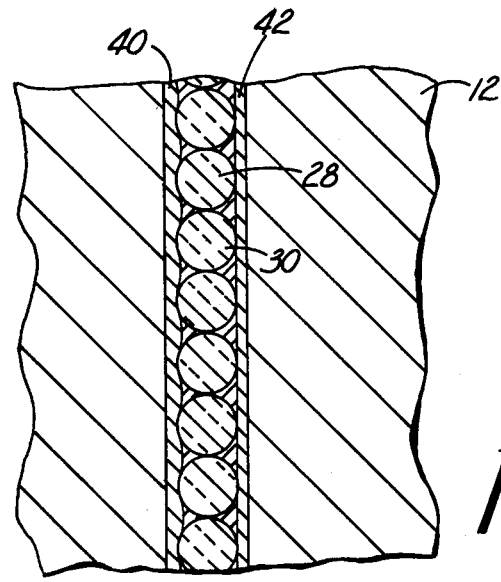

WEAR COMPENSATING OPTICAL/MAGNETIC TRANSDUCER

BACKGROUND OF THE INVENTION

The present invention is generally related to magnetic read heads and, more particularly, to a versatile reader for sensing both magnetic and optical data from a credit card or other data carrying member.

Credit card alteration, duplication and counterfeiting have become increasingly large problems in recent years. Proposals have been made to provide credit card structures with secure properties or features. One such security feature is disclosed in copending U.S. patent application Ser. No. 581,428, entitled SECURE PROPERTY DOCUMENT AND METHOD OF MANUFACTURE, in the name of Charles K. Beck et al. and assigned to the assignee of the present invention. Briefly, this security feature entails the use of infrared reflectors which are deposited beneath the magnetic media to define optical data elements which are sensed by an IR detector. This optical data may be related in some way to magnetic data recorded on one of the magnetic stripe data tracks, such as disclosed in copending U.S. patent application Ser. No. 581,351, entitled SECURE PROPERTY DOCUMENT AND SYSTEM, filed in the name of Francis C. Foote and assigned to the assignee of the present invention. The application discloses a reading arrangement entailing the use of an optical IR detector and a magnetic read head mounted in a predetermined spacial relationship. The spacing between the optical detector and magnetic read head may be set at the factory to provide proper timing between the magnetic and optical data sets. The timing may also be adjusted electronically through the use of appropriate circuitry. It has been found that temperature changes may alter the spacing between the magnetic read head and optical detector, thereby adversely affecting the relative timing between the magnetic and optical data. This timing may also be adversely affected by thermal expansion or contraction of the credit card due to changes in ambient temperatures.

These various timing problems may be cured to some extent by mounting the magnetic read head immediately beside the optical detector. This, however, is often inappropriate due to the limited width of the magnetic stripe and the fact that the optical data area is located directly beneath the magnetic stripe. It is also important to note that significant timing errors between the optical and magnetic data may be caused due to skewing of the card or data elements relative to the read head.

These problems are resolved through the use of a composite read head of the type disclosed in copending U.S. patent application Ser. No. 581,423, entitled COMPOSITE MAGNETIC/OPTICAL READER AND METHOD. That application was filed in the name of Robert A. Rubenstein and is assigned to the assignee of the present invention. The application discloses a composite reader for sensing magnetic data at the same point in time as the underlying optical data element. This is achieved by directing infrared radiation through the reluctance aperture of the magnetic read head. If a reflector is present in the area directly beneath the aperture, the IR radiation is reflected back through the aperture to appropriate IR detector.

Improved reading and recording accuracy may be achieved by providing a relatively narrow reluctance gap in the range of 1-2 mils. It has been found, however, that in many applications it is difficult to successfully direct a beam of IR radiation through such a narrow gap due to several limitations, such as the refractive index, configuration of the solid material molded into the gap, and the small space available for mounting the required optical components within the magnetic head. These problems may be overcome by directing the radiation through an appropriate prism mounted in a groove formed in the face of the magnetic read head and extending perpendicular to the magnetic reluctance apertures. This arrangement is disclosed in copending patent application Ser. No. 674,562, entitled DATA TRANSDUCER, filed Apr. 7, 1976, in the name of Robert H. Trenkamp and assigned to the assignee of the present invention. The embodiment disclosed therein provides for alignment of the optical and magnetic reading apertures, with the incident radiation focussed through a lens and prism to a plane coincident with the presented optical reflector.

It has been found that while the transducer disclosed by application Ser. No. 674,562 provides excellent results, the reading accuracy diminishes somewhat after long periods of use. This is caused, at least in part, by wear of the read head contact surfaces through wiping action against the abrasive magnetic stripe medium. As the read head continues to wear, the length of the optical path is shortened and the size of the optical reading aperture is changed to a point which adversely affects the reading accuracy or ability to determine the reflector locations relative to the flux reversals on the magnetic stripe.

SUMMARY OF THE INVENTION

The present invention overcomes the above-described wear problem, yet allows reading of the optical and magnetic data through apertures lying in approximately the same plane. This is achieved by handling the radiant energy through thin optical fibers disposed in the reluctance gap of the magnetic read head. The ends of the fibers define the optical reading aperture and are held in wiping engagement with each data member during reading. The tips of the fingers wear down evenly with the contact surface of the magnetic head. Therefore, the reading aperture, which is defined by the fiber ends, remains substantially constant in size and location over long periods of use. This significantly reduces the need for periodic maintenance (i.e., focussing) or costly replacement of the transducers in the field.

It is an object of the present invention to provide a versatile optical and magnetic transducer with optical and magnetic reading apertures in general alignment with each other and wherein the optical aperture remains substantially constant in size and location over long periods of use.

Another object of the present invention is to provide a unique optical and magnetic transducer comprising a magnetic read head having a reluctance aperture containing a plurality of optical fibers for sending and receiving radiant energy to and from reflectors of a data member being read.

It is a further object of the present invention to provide a novel optical and magnetic read head with optical fibers having ends which wear down with the contact surfaces of the magnetic head whereby the size of the optical reading aperture is held substantially constant over long periods of use.

BRIEF DESCRIPTION OF THE DRAWINGS

FIG. 1 is a perspective view of the transducer of the present invention shown in operative engagement with the data area of a credit card or other data bearing member.

FIG. 2 is a partial side elevation of the transducer and card illustrated in FIG. 1.

FIG. 3 is an enlarged partial sectional view of the transducer in the area of the reluctance gap.

FIG. 4 is an enlarged cross section of a portion of the optical fibers as they are bonded together prior to mounting in the reluctance gap.

FIG. 5 is an enlarged cross section of a portion of the optical fibers secured between the magnetic pole pieces.

DESCRIPTION OF THE PREFERRED EMBODIMENT

Referring now, more particularly, to FIGS. 1-3 of the drawings, the data transducer of the present invention is generally indicated by the numeral 10 and includes a core 12 of magnetic material, such as ferrite or other well known commercially available material used for magnetic read heads. The core is provided with a central opening and a pair of appropriate output windings 14 and 16 which provide electrical output signals indicative of the magnetic data being read. The core is separated into two optically disposed magnetic pole pieces by a pair of reluctance apertures 18 and 20 at the top and bottom of the transducer, respectively. Preferably, the bottom surfaces of the pole pieces are of curved configuration and are adapted to be brought into operative sliding engagement with a card 22, or other data bearing member containing both optical and magnetic data elements.

The data bearing member 22 contains a plurality of reflective elements 24 which underlie (or overlie) a magnetic stripe 26. These elements define optical data which may be utilized for various purposes such as determining the authenticity of a presented card or document. A detailed description of such a card structure and associated system for processing the data are disclosed in the above U.S. patent application Ser. Nos. 581,428 and 581,351 which are incorporated herein by reference.

Reluctance aperture 20 contains the end portions of a first group of optical fibers 28 which extend between an infrared source, or other appropriate radiation source, and the bottom of reluctance aperture 20. A second group of optical fibers 30 also extend into the confines of reluctance aperture 20 and are intermingled with optical fibers 28 to provide reflected radiation to an appropriate IR detector, not illustrated. Preferably, the optical fibers are made of glass material, such as those which are commercially available under the CORNING GLASS trademark. It has been found that this type of fiber is suitable for handling infrared radiation to determine the presence of reflectors on data members. Of course, it is not intended that the present invention be limited to the use of glass optical fibers, as other types may be suitable depending upon the nature of the radiation and particular application.

Reading of the optical and magnetic data elements is achieved by effecting relative movement between card 22 and transducer 10. Preferably, this is achieved by suitable card transport means, such as the drive rolls generally indicated by the numeral 32. During the reading process, the bottom surfaces of the transducer are held in wiping or sliding engagement with the card in the area of the magnetic stripe 26. This intimate contact with the magnetic recording member provides accurate detection of high density recorded flux reversals. In addition, the presence of reflective elements 24 directly beneath the area of the reluctance aperture 20 are readily detected. It will be appreciated that the ends of the optical fibers define an optical reading aperture through which the presence or absence of the reflective elements is detected. Since the optical fibers are located within the confines of the reluctance gap, the magnetic and optical reading apertures lie in a common plane, and for practical purposes may be considered to be coincident with each other. This has been found to be most advantageous for sensing security data which is defined by the spacial relationship between the optical and magnetic data elements. Since the optical and magnetic reading apertures are coincident with each other, timing errors due to temperature changes and speed variations are substantially eliminated.

It will be appreciated that the ends or tips of the optical fibers are held in intimate wiping or sliding engagement with the data area of the document during reading. Due to the abrasive action of the card rubbing against the contact surfaces of the magnetic pole pieces and optical fiber this type of fiber is suitable for handling infrared radiation to determine the presence of reflectors on data members. Of course, it is not intended that the present invention be limited to the use of glass optical fibers, as other types may be suitable depending upon the nature of the radiation and particular application.

Reading of the optical and magnetic data elements is achieved by effecting relative movement between card 22 and transducer 10. Preferably, this is achieved by suitable card transport means, such as the drive rolls generally indicated by the numeral 32. Alternately, the transducer may be transported over the card. During the reading process, the bottom surfaces of the transducer are held in wiping or sliding engagement with the card in the area of the magnetic stripe 26. This intimate contact with the magnetic recording member provides accurate detection of high density recorded flux reversals. In addition, the presence of reflective elements 24 directly beneath the area of the reluctance aperture 20 are readily detected. In some applications the transducer will ride on a layer of material overlying the data member. It will be appreciated that the ends of the optical fibers define an optical reading aperture through which the presence or absence of the reflective elements is detected. It is necessary that the ends be spaced slightly from the reflector surfaces to permit the reflected radiation to be picked by fibers 30. This spacing may be provided by the thickness of the magnetic medium 26, or by a protective layer, if utilized. Since the optical fibers are located within the confines of the reluctance gap, the magnetic and optical reading apertures lie in a common plane, and for practical purposes may be considered to be coincident with each other. This has been found to be most advantageous for sensing security data which is defined by the spacial relationship between the optical and magnetic data elements. Since the optical and magnetic reading apertures are coincident with each other, timing errors due to temperature changes and speed variations are substantially eliminated.

It will be appreciated that the ends or tips of the optical fibers are held in the intimate wiping or sliding engagement with the data area of the document during reading. Due to the abrasive action of the card rubbing against the contact surfaces of the magnetic pole pieces and optical fiber ends, wear will result over a period of time. This is particularly true of magnetic stripes which have been applied by hot stamping processes, wherein the relatively rough magnetic medium is brought into direct contact with the read head. As pointed out above, with the transducers disclosed in the above referenced patent applications, it was necessary to provide lenses or other suitable optical means for concentrating or focussing the radiation in a narrow area which defines the optical reading aperture. Wearing of the contact surfaces of the magnetic pole pieces tends to shorten the length of the optical path which changes the size or location of the optical reading aperture over a period of time. Such changes may produce erroneous data in the environment of security systems which must detect the positions of the optical reflectors with a high degree of precision.

With the transducer of the present invention, the optical reading aperture is defined by the ends of the optical fiber, which wear down with the neighboring contact surfaces of the magnetic pole pieces. The effects of surfaces wear is illustrated in FIG. 3, wherein dash line 34 indicates the location of the contact and sensing surfaces after considerable wear. It should be noted that the relative dimensions of FIG. 3 are not necessarily to scale. When the transducer is held in intimate contact with the documents during each reading, the size and location of the optical reading aperture remains constant with wear of the transducer over long periods of time. Preferably, the abrasion, or wear, resistance of the optical fiber ends is less than or equal to that of the pole material in the area of the contact surfaces. This will assure fairly even wear such that the sensing surface of the optical fiber ends will be substantially coplanar with the contact surfaces of the magnetic pole pieces.

Referring to FIGS. 4 and 5, the detailed structure of the preferred embodiment of the present invention may be more fully understood. The size of the optical fibers selected is determined to some extent by the ultimate spacing between the magnetic pole pieces, which spacing defines the magnetic reluctance aperture. Unless the end portions of the fibers are to be modified in some way, the diameter of each fiber must be less than or equal to the ultimate width of the magnetic reluctance gap. For the transducer of the present invention, a gap dimension of 1–2 mils. has been found to be suitable for detecting security data elements with acceptable accuracy. Thus, the fiber diameters are within the restraints of 1–2 mils. Before the pole pieces of the transducer are assembled, the end portions of the optical fibers are positioned in a suitable jig or comb and are encapsulated with a thermo-setting epoxy resin 36, or other suitable bonding material. Preferably, the fiber end portions are arranged such that every other fiber will go to fiber group 28 extending to the IR source, with the other fibers being included in group 30 to the IR detector. The amount of resin 36 used to encapsulate the fibers is held to a minimum to assure that the combined thickness of the fiber ends and resin does not exceed the intended reluctance gap dimension. Thus, the top surface 38 of the encapsulated fibers illustrated in FIG. 4 may assume a generally rippled configuration.

After the resin 36 has hardened sufficiently, the fiber end portions together define a rigid block for insertion between the magnetic pole pieces. The ends of the fibers may be polished at this stage of the process to provide a smooth, generally planar, sensing surface. Alternately, the fiber ends may be polished after assembly between the magnetic pole pieces.

The encapsulated optical fiber end portions are sandwiched between the magnetic pole pieces, with layers 40 and 42 of suitable adhesive between the pole piece faces and the encapsulated fibers. One such adhesive in Norlind Optical Adhesive No. 61, manufactured by Prolind, Inc. An appropriate jig or the like, not illustrated, positions the pole piece to provide the proper dimension for the magnetic reluctance aperture. Preferably, the thickness of adhesive layers 40 and 42 is held to a minimum, such dimensions being exaggerated somewhat in FIG. 5 for the purposes of illustration. It is desirable to maintain the optical fiber centered between the pole piece faces to provide a corresponding centering of the optical reading aperture.

It is not intended that the present invention be limited to the manufacturing steps described above relative to FIGS. 4 and 5. It is conceivable that the optical fiber end portions may be assembled with the magnetic pole pieces in various ways. For example, the encapsulation and assembly steps may be combined into a single step. With such a process it may be desirable to utilize a fiber diameter equal to the reluctance gap dimension. Thus, the fibers define the spacing between the pole piece faces, thereby eliminating any adhesive layer gap, such as layers 40 and 42 of FIG. 5.

From the foregoing description it will be appreciated that the transducer of the present invention provides means for reading both magnetic and optical data over a long period of time without the need for making field adjustment to the optical system. Since the ends of the optical fibers wear evenly with contact surfaces of the adjacent magnetic pole pieces, the size and location of the optical reading aperture remains constant over long periods of use. It will also be appreciated that the wiping action during the reading process provides a continuous cleaning of system optics. This is a benefit not realized by the transducers disclosed in the above-referenced applications. Also the end portions of the optical fibers define, at least in part, a spacer for the pole pieces. This is substantially different than glass filler spacers which would present many optical problems in handling infrared radiation due to the meniscus top surface and other optical restraints. It should also be noted that the use of optical fibers allows the detector and source to be mounted at various locations. This allows easy replacement without disturbing the magnetic head. This also permits mounting of the detector at a location where it will not be adversely affected by temperature conditions, which is a common problem with infrared detectors.

It is not intended that the present invention be limited to the magnetic pole piece configuration illustrated in the drawings. While the use of dual winding and reluctance apertures has become common for eliminating signals due to stray magnetic fields, a single winding, single gap construction may be utilized with the present invention, if desired.

While the invention has been particularly shown and described with reference to the preferred embodiments thereof, it will be understood by those skilled in the art that the foregoing and other changes in the form and detail may be made within the spirit and meaning of the invention.

We claim:

1. A transducer for reading optical and magnetic data from a document in operative sliding engagement therewith, said transducer comprising:
   a magnetic read head comprising a core of magnetic material having a contact surface adapted to slidably engage documents during reading and a magnetic reluctance aperture disposed in the area of said contact surface, and
   optical means for delivering and receiving radiant energy to and from documents as they are read, said optical means comprising a plurality of optical fibers each with an end portion of uniform cross-sectional area extending through said reluctance aperture to an end, the ends of said optical fibers providing an optical sensing surface defining a reading aperture of predetermined size substantially coplanar with said contact surface and adapted to engage documents during reading whereby said reading aperture remains substantially coplanar with said contact surface and the size of said aperture remains substantially constant with wear.

2. The transducer set forth in claim 1 wherein said magnetic core is comprised of a pair of magnetic pole pieces separated by said aperture by a predetermined dimension.

3. The transducer set forth in claim 2 wherein the end of each fiber is located approximately midway between said pole pieces.

4. The transducer set forth in claim 3 wherein said optical fibers fill a substantial portion of said reluctance aperture.

5. The transducer set forth in claim 4 wherein each said fiber is approximately equal to said aperture dimension in cross-sectional width.

6. The transducer set forth in claim 5 wherein the end portions of said optical fibers are bonded within said reluctance aperture and maintain said apertures spacing dimension.

7. The transducer set forth in claim 1 wherein the abrasion resistance of said optical fiber ends is less than or equal to that of said core contact surface.

8. In combination:
   a data member having readable magnetic and optical data contained in a data area,
   transducer means for reading the magnetic and optical data from said data member, said transducer comprising:
   a magnetic read head including a core of magnetic material having a contact surface of known abrasion resistance engaging said data area and having a reluctance gap defining a magnetic reading aperture disposed in the region of said contact surface, and
   optical means for delivering and receiving radiant energy to and from said data area, said optical means including a plurality of optical fibers extending through reluctance gap, the ends of said optical fibers providing an optical sensing surface defining an optical reading aperture, said contact surface and said sensing surface operatively engaging said data area, said optical sensing surface having an abrasion resistance less than or equal to that of said contact surface whereby the ends of said optical fibers wear with said contact surface and the relative positions of said optical and magnetic reading apertures remain substantially constant, and
   motive means for effecting relative movement between said read head and said data member with contact surface and optical sensing surface in wiping engagement with said data area.

9. The transducer set forth in claim 8 wherein the cross-sectional area of each said optical fiber is substantially uniform within the confines of said reluctance aperture, whereby the size of said optical reading aperture remains substantially constant with wear of said optical fiber ends.

10. A method for reading optical and magnetic data from a plurality of data members over a period of time, said method comprising:
   providing a magnetic read head having a core of magnetic material with a contact surface of known abrasion resistance and a magnetic reluctance aperture disposed in the region of said contact surface and optical means comprising a plurality of optical fibers extending through said reluctance aperture with the ends of the optical fibers providing an optical sensing surface defining a reading aperture of predetermined size, said sensing surface having an abrasion resistance less than or equal to that of said contact surface,
   bringing said contact and sensing surfaces into intimate wiping engagement with each data member while producing relative movement therebetween, said contact and sensing surfaces wearing down together when each data member is read whereby the size of said reading aperture remains substantially constant over a long period of use.

* * * * *

UNITED STATES PATENT AND TRADEMARK OFFICE
CERTIFICATE OF CORRECTION

PATENT NO. : 4,056,712
DATED : November 1, 1977
INVENTOR(S) : Robert H. Trenkamp and Gerald A. Dissauer It is certified that error appears in the above-identified patent and that said Letters Patent are hereby corrected as shown below:

Column 2, line 43, "fingers" should be deleted and "fibers" substituted therefor.

Signed and Sealed this

Thirteenth Day of June 1978

[SEAL]

Attest:

RUTH C. MASON
*Attesting Officer*

DONALD W. BANNER
*Commissioner of Patents and Trademarks*